United States Patent
Nixon

[15] 3,698,772
[45] Oct. 17, 1972

[54] BRAKE CONTROL SYSTEM FOR PULSING VEHICLE BRAKES AT VARIABLE PULSE RATES

[72] Inventor: James E. Nixon, Warren, Mich.
[73] Assignee: Borg-Warner Corp., Chicago, Ill.
[22] Filed: March 18, 1970
[21] Appl. No.: 20,678

[52] U.S. Cl............303/21 BE, 188/181 A, 303/20, 303/61
[51] Int. Cl................................................B60t 8/12
[58] Field of Search......73/488; 188/181; 250/231 R, 250/231 SE, 233; 317/5, 124; 324/160, 161, 162; 328/1; 340/262, 263; 356/27, 28; 303/20, 21, 61

[56] References Cited

UNITED STATES PATENTS

| 3,494,671 | 2/1970 | Slavin et al. | 303/21 P |
| 3,525,553 | 8/1970 | Carp et al. | 303/21 P |
| 3,499,689 | 3/1970 | Carp et al. | 303/21 P |

FOREIGN PATENTS OR APPLICATIONS

| 1,914,765 | 10/1970 | Germany | 303/21 BE |

Primary Examiner—Milton Buchler
Assistant Examiner—Stephen G. Kunin
Attorney—Donald W. Banner, William S. McCurry and John W. Butcher

[57] ABSTRACT

A brake control system includes an actuator which relieves and restores the braking force to a vehicle wheel in a cyclical manner under control of a timer. The timer normally operates at a first rate when it receives both a braking command signal and a wheel deceleration signal. If the vehicle deceleration exceeds a certain level, the rate of timer operation, and therefore the rate of actuator operation, is changed to a second rate to accommodate the wheel-to-road adhesion range indicated by the vehicle deceleration signal.

20 Claims, 5 Drawing Figures

Inventor
James E. Nixon

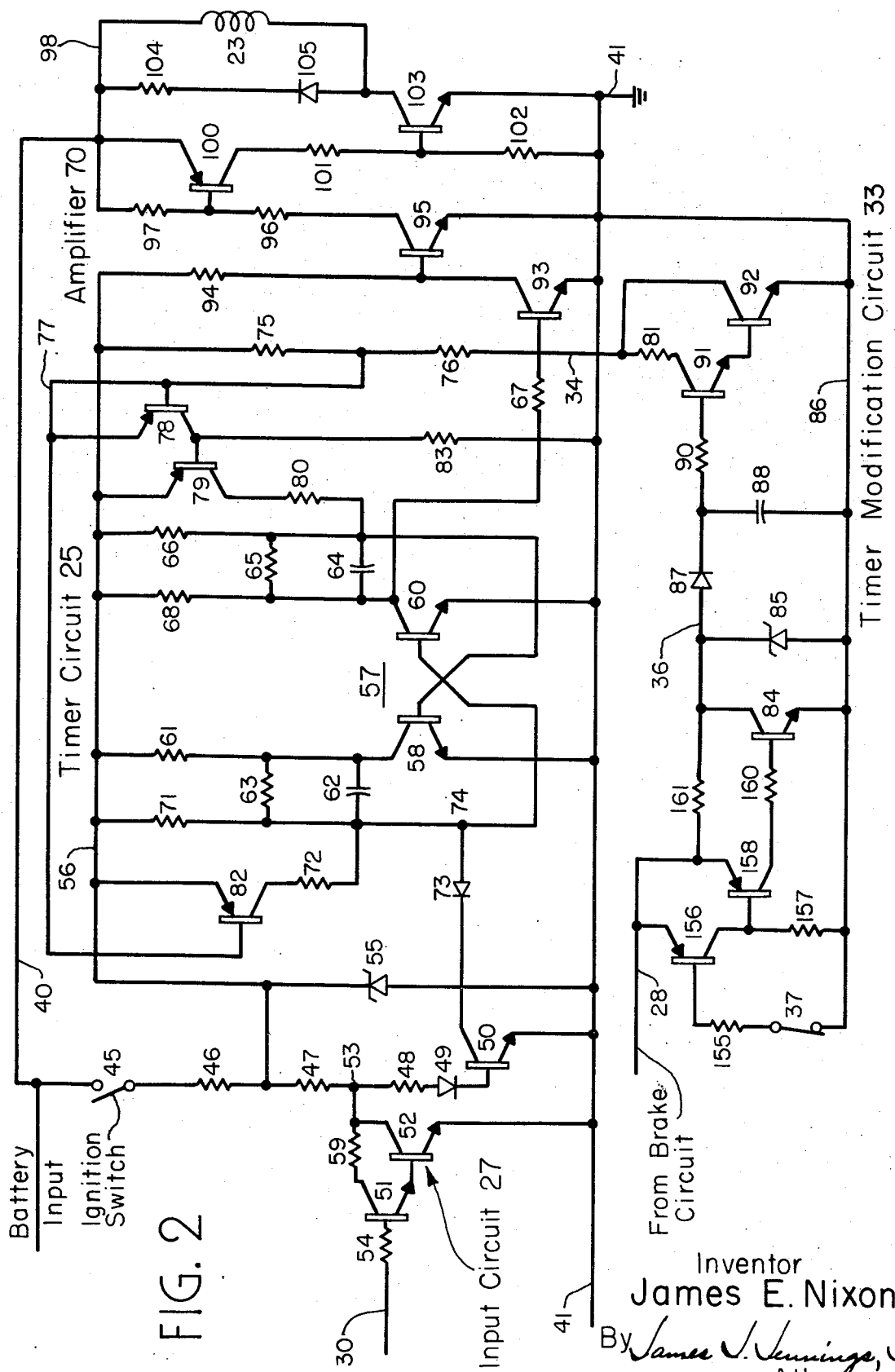

Inventor
James E. Nixon

By James J. Jennings, Jr.
Attorney

BRAKE CONTROL SYSTEM FOR PULSING VEHICLE BRAKES AT VARIABLE PULSE RATES

BACKGROUND OF THE INVENTION

In the field of brake control it has been known for some time that the wheels on a vehicle, whether an aircraft, automobile, truck, or other vehicle with a conventional braking system, can be locked to produce a skid condition. This occurs as the level of the force applied through the braking system, which causes the braking member to grip the wheel, exceeds the level of adhesion or frictional engagement between the wheel and the surface of the road or runway. In an automobile which skids, the rear of the vehicle frequently swings outwardly of the line of vehicle travel as the car enters an uncontrolled skid. Various approaches have been attempted in an effort to prevent the wheel lockup and consequent skidding.

The drawbacks in most previous attempts in this field are principally in the complexity, physical size and expense of the anti-skid arrangement. It has proved difficult to determine the coefficient of friction between the braked wheel and the road surface at the instant braking commences, and to operate the anti-skid system in a manner compatible with the road conditions then prevailing. More specifically, when an actuator is provided to relieve the braking pressure and allow the wheel to spin back up towards the vehicle speed to prevent skid, the braked wheel will spin up much more rapidly if the vehicle is then on dry pavement than if the wheel is then rolling over a wet surface or ice. The most effective rate at which the brakes should be "pumped" or at which the actuator should be cycled is significantly different for operation on the dry pavement than the optimum rate for controlled braking on a wet or icy pavement.

It is therefore a principal consideration of the present invention to provide a controlled braking system in which the braking force is cyclically reduced and allowed to increase at a first rate when the road conditions are wet or icy, in the low coefficient of friction range, and in which the system pulsing is changed to a second rate responsive to a signal indicating the road conditions are in a second range of coefficient or friction, denoting dry pavement.

It is a corollary consideration of this invention to provide such a system which is inexpensive, compact and practical for application to existing motor vehicles.

Another important consideration is the provision of such a system which can be simply modified to operate with three, or more, separate rates of cyclical variation of the braking force.

SUMMARY OF THE INVENTION

A brake control system constructed and operated in accordance with the present invention applies a braking force to a vehicle wheel responsive to the provision of a braking command. The system includes an actuator connected in the braking system, operative when energized to reduce the level of the applied braking force to prevent wheel skid. The actuator is also operative when deenergized to terminate reduction of the braking force and allow the system to commence restoration of the braking force.

In particular, the system of this invention includes a timer circuit connected to energize and deenergize the actuator in a cyclical manner at a first rate. An input circuit is connected to initiate operation of the timer circuit when the input circuit receives both a first signal indicating the braking command has been provided and a second signal indicating deceleration of the braked wheel has exceeded a preset level. Means, such as a pedal switch actuated by the brake pedal, is provided for applying the first signal to the input circuit when the braking command is issued. Another means, including a first sensor, is provided for applying the second signal to the input circuit when the deceleration of the braked wheel or wheels exceeds the preset level. An important component is a timer modification circuit, connected to change the cyclical operation of the timer circuit from the first rate to a second rate upon receipt of a third signal indicating that deceleration of the braked vehicle has exceeded a predetermined level. Means is provided for applying this third signal to the timer modification circuit when the deceleration of the vehicle itself exceeds the predetermined level.

THE DRAWING

In the several figures of the drawings like reference numerals indicate like elements. In the drawings:

FIG. 2 is a schematic diagram setting forth details of circuits shown in block form in FIG. 1;

GENERAL SYSTEM DESCRIPTION

Figure 1:
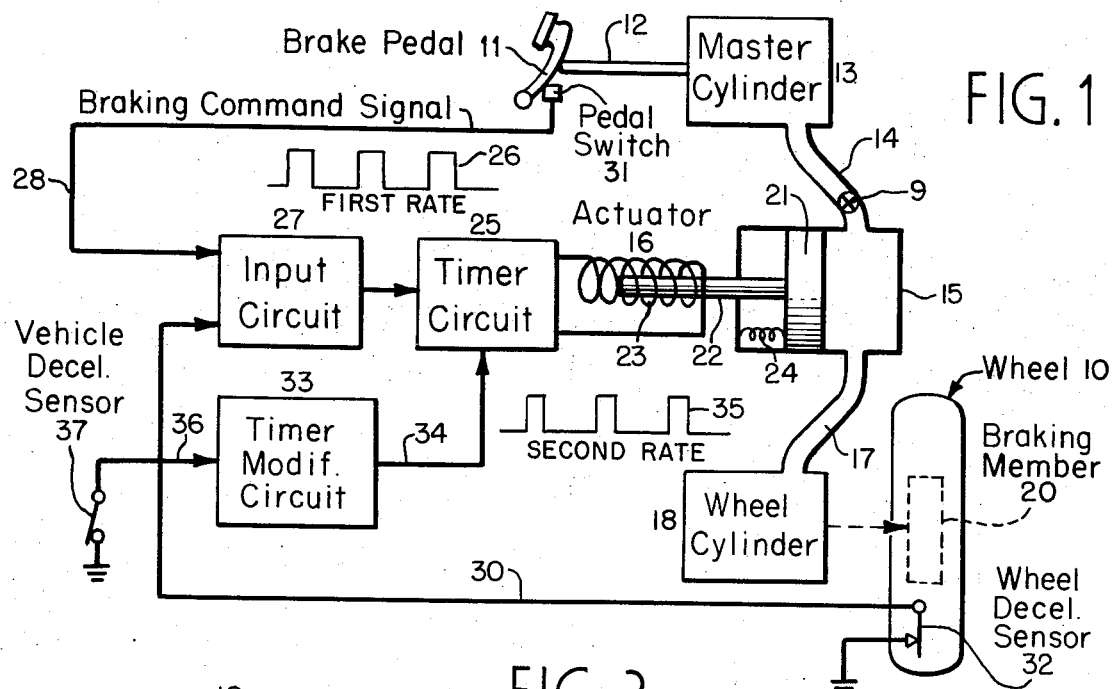
FIG. 1 is a block diagram illustrating the cooperation of the present invention with conventional components of a braking system.

FIG. 1 depicts a braking system in which the angular displacement of a wheel 10 is retarded as a braking command is provided by depressing a brake pedal 11. Braking force is translated over a link 12 to the master cylinder 13, for passing fluid through a conduit 14 into the bore 15 of an actuator assembly 16. In turn this bone is connected through another conduit 17 to a wheel cylinder 18 for for applying force or displacing a braking member 20 to retard the wheel. The braking member can be a conventional drum or disc brakes or any other unit, normally utilized to frictionally engage the wheel and thereby slow the vehicle. The specific form of the brakes and of the actuation is not material to the basic considerations of this invention.

Actuator 16 also includes a piston 21 coupled to an extended core member 22 for displacement to the left as winding 23 is energized. The piston is positioned for return within bore 15 to the right under the urging of a return spring 24 when the energizing signal is removed from winding 23. Other types of actuators may be utilized; it is only requisite that whatever actuator means is employed be connected to operate for reducing the level of the applied braking force to prevent wheel skid, and thereafter to terminate reduction of the braking force and allow the system to commence increasing the braking force toward the initial level.

Particularly in accordance with the present invention a timer circuit 25 is provided and connected to energize and deenergize the actuator 16 in a cyclical manner at a first rate, represented by the waveform 26. Timer circuit 25 is energized when input circuit 27 receives both a first signal over line 28 indicating that a braking command has been provided, and a second signal over line 30 which denotes that deceleration of the braked wheel 10 has exceeded a preset level. A pedal switch 31 is connected as the means for applying the first signal to input circuit 27 whenever the braking command is issued by depressing brake pedal 11. A wheel deceleration sensor 32 is shown as a normally closed switch with one contact coupled to vehicle ground. Other deceleration sensors, such as an assembly for sensing the angular velocity of the prop shaft (and thus providing a signal which is an average of the two rear wheel velocities), may also be used. Switch 32 may function as a first sensor to apply the second signal over conductor 30 to the input circuit 27 whenever the deceleration of the braked wheel exceeds the preset level. Deceleration sensors such as that shown generally in FIG. 1 are well known in the art, and may comprise a small contact mounted for displacement against the bias of a spring whenever the deceleration of wheel 10 exceeds a preset level, which level is determined by the amount of spring bias applied against the contact.

Further in accordance with this invention a timer modification circuit 33 is provided and connected over conductors represented by line 34 in FIG. 1 to change the cyclical operation of timer circuit 25 from the first rate represented by waveform 26 to a second rate represented by waveform 35. This change is provided by timer modification circuit 33 upon receipt of a third signal over conductor 36 indicating that deceleration of the braked vehicle has exceeded a predetermined level. This third signal is provided by a vehicle deceleration sensor means 37 which may be a unit essentially similar to the other sensor unit 32, but affixed to the vehicle body to provide the signal by opening its contact set whenever the vehicle deceleration exceeds a predetermined level as determined by whatever bias level is utilized in the sensor unit 37. In this way the actuator can be regulated at the first rate whenever the timer circuit is energized in accordance with the braking and wheel deceleration signals to indicate a panic stop condition is occurring, and when the vehicle is on dry pavement the vehicle deceleration unit 37 will be actuated to modify the operation of timer circuit 25 to the second rate and provide the preferred pulsing of actuator 16 for the surface condition then encountered.

DETAILED DESCRIPTION OF THE INVENTION

Circuit Arrangement

The schematic details of timer circuit 25, timer modification circuit 33, and a portion of input circuit 27, together with other components, are illustrated in FIG. 2. The system is designed in a preferred embodiment for operation from a conventional 12-volt automotive battery with energy supplied over a first energizing conductor 40 and a second energizing input conductor 41, illustrated as connected to a vehicle ground.

At the left side of FIG. 2 a series circuit is connected between the conductors 40, 41. This series circuit comprises ignition switch 45, closed every time the key is turned in the ignition, resistors 46, 47, and 48, diode 49, and the base-emitter path of an NPN type transistor 50. The input circuit further comprises NPN type transistors 51, 52 intercoupled in a Darlington-pair connection as shown. The emitter of transistor 51 is coupled to the base of transistor 52, and the emitter of transistor 52 is coupled to ground conductor 41. The collectors of both transistors 51, 52 are coupled to opposite ends of resistor 59, and the collector of transistor 52 is connected to the common connection 53 between resistors 47 and 48. A resistor 54 is coupled between the base of transistor 51 and the input line 30 over which the wheel deceleration signal is received. As will be seen hereinafter this signal may be provided by a simple inertia switch, as represented generally in FIG. 1, or by any of the circuits shown in FIGS. 3-5.

In timer circuit 25, a Zener diode 55 is coupled between ground conductor 41 and another energizing conductor 56 which is also coupled to the common connection between resistors 46 and 47 to receive input energy over ignition switch 45. In the preferred embodiment of this invention, for which typical circuit values will be given hereinafter, a Zener diode was selected to provide approximately 5.1 volts on conductor 56, which voltage is measured as positive with respect to ground conductor 41.

A central component in the timer circuit 25 is a multivibrator circuit 57, which includes a pair of NPN type transistors 58, 60 connected in a well known multivibrator configuration. That is, transistor 58 has its collector coupled through a resistor 61 to conductor 56, and its emitter connected directly to conductor 41. The collector of transistor 58 is also coupled to one side of a capacitor 62, and one side of a resistor 63. The base of transistor 58 is coupled to the common connection between a capacitor 64, and resistors 65, 66, and 80.

The emitter of transistor 60 is coupled directly to ground conductor 41, and the collector of this transistor is coupled to an output resistor 67 over which the multivibrator signal is passed to an amplifier circuit 70. The collector is also coupled to the other sides of capacitor 64 and resistor 65, and is coupled through a resistor 68 to energizing conductor 56. The base of transistor 60 is coupled to the common connection between capacitor 62, resistor 63, resistor 71, resistor 72 and the anode of diode 73, the cathode of which is coupled to the collector of transistor 50. The multivibrator circuit is normally clamped by a hold-off signal passed from transistor 50 in the input, or latching, circuit 27, and over diode 73 to connection 74 in the multivibrator circuit.

It will become evident that multivibrator 57 operates at a first rate when first RC timing circuit 62, 71, 72 and second RC timing circuit 64, 66, 80 are set at first values, and the multivibrator operates at a second rate when these RC timing circuits are changed to second values. The circuit for effecting this switching will now be described.

Other components shown as physically located in the multivibrator circuit are actually operated by a control signal received from timer modification circuit 33 to change the effective time constants of the multivibrator circuit from first to second values and thereby vary the rate at which output pulses are passed over resistor 67 from first rate 26 to second rate 35 as shown in FIG. 1. A pair of resistors 75 and 76 are coupled in series between energizing conductor 56 and conductor 34 over which a signal is received from the timer modification circuit 33. This signal is extended from the midpoint of resistors 75, 76 over conductor 77 to two different circuits. Conductor 77 is coupled to the base of a first PNP type transistor 78, which has its emitter coupled directly to conductor 56. The collector of transistor 78 is coupled to the base of another PNP type transistor 79, and this collector is also coupled to one side of resistor 83. The emitter of transistor 79 is coupled to conductor 56. A resistor 80 is coupled between the collector of transistor 79 and the bottom of resistor 66. Transistor 78 is normally off and transistor 79 is normally on, so that the parallel circuit including resistors 66, 80 is coupled in series with capacitor 64 to determine one RC time constant in the multivibrator circuit. When transistor 78 is gated on to switch transistor 79 off, resistor 80 is in effect removed from the time constant determining circuit which includes capacitor 64. Conductor 77 is also coupled to the base of another PNP type transistor 82, which has its emitter coupled directly to conductor 56 and its collector coupled through a resistor 72 to common connection 74. Transistor 82 is normally off. When transistor 82 is gated on, resistors 71 and 72 are effectively placed in parallel to alter the RC time constant of the circuit which includes capacitor 62 to determine the other RC time constant in the multivibrator circuit. Thus transistor 82, and the transistor pair 78, 79, may be considered as control switches for regulating the values of the RC timing circuits in the multivibrator arrangement.

In the timer modification circuit 33, an input resistor 155 is coupled between vehicle deceleration switch 37 and the base of a PNP type transistor 156, which has its emitter coupled to brake circuit conductor 28. The collector of transistor 156 is coupled over a resistor 157 to conductor 86, in turn coupled to ground conductor 41. Another PNP type transistor 158 has its emitter coupled to conductor 28, and its base coupled to the common connection between resistor 157 and the collector of transistor 156. The collector of transistor 158 is coupled through a resistor 160 to the base of an NPN type transistor 84, which has its emitter coupled to conductor 86. The collector of transistor 84 is coupled to conductor 36, which in turn is coupled over a resistor 161 to brake circuit conductor 28. A Zener diode 85 is coupled between conductors 36 and 86, in parallel with a series circuit including diode 87 and a capacitor 88. Another resistor 90 has its left side coupled to the common connection between diode 87 and capacitor 88, and its right side coupled to the base of another NPN type transistor 91 intercoupled with another NPN transistor 92 in a Darlington-pair connection. The emitter of transistor 91 is coupled to the base of transistor 92, and the emitter of transistor 92 is connected to conductor 86. The collectors of transistors 91, 92 are coupled together over resistor 81, which is coupled over conductor 34 to resistor 76.

Considering amplifier circuit 70, an NPN type transistor 93 has its emitter coupled to ground and its base coupled to output resistor 67. The collector of transistor 93 is coupled through a resistor 94 to energizing conductor 56, and the collector is also coupled to the base of another NPN type transistor 95, the emitter of which is grounded. The collector of transistor 95 is coupled through a series circuit including resistors 96, 97 to another conductor 98, which in its turn is coupled to the battery supply conductor 40. A PNP type transistor 100 has its base coupled to the common connection between resistors 96, 97 and its emitter coupled to conductor 98. The collector of transistor 100 is coupled through a series circuit including resistors 101 and 102 to ground conductor 41. Another NPN type transistor 103 has its emitter grounded and its base connected to the common connection between resistors 101, 102. The collector of resistor 103 is coupled, through winding 23 of the solenoid or actuator shown in FIG. 1, to conductor 98. A protective circuit comprising a resistor 104 and a diode 105 is coupled in parallel with winding 23 to protect transistor 103 against destruction by "punch-through" caused by the inductive kick when conduction of this transistor 103 is interrupted and the level of current flow through winding 23 is rapidly reduced, providing a large voltage across winding 23.

Circuit Operation

Before the key is turned to close ignition switch 45, an energizing potential difference is applied to the right-hand portion of amplifier circuit 70 over conductors 40, 41. However from the manner of connection of the semiconductors 95, 100 and 103 it is apparent that none of these transistors conducts under these conditions. Thus there is no current flow through winding 23 and actuator 16 is not operated.

Responsive to closure of ignition switch 45, a series circuit is completed through this switch and resistor 46 to conductor 56 to provide energy to timer circuit 25. Another circuit is also completed from resistor 46, through resistors 47, 48 and diode 49 to the base of transistor 50. At this time current flows from conductor 56 over three parallel paths (transistor 79 to ground, resistor 71, and resistors 61, 63); the latter two currents flow through diode 73 and the collector-emitter path of transistor 50. Thus the potential at common connection 74 is very low, close to the ground potential on conductor 41. Accordingly at this time the multivibrator circuit 57 is clamped in a condition with transistor 60 off or non-conducting, and transistor 58 conducting.

Assuming now that a braking command is issued by displacing the brake pedal and closing pedal switch 31, but that the level of wheel deceleration is not yet sufficient to open switch 32, current flows from conductor 40 through the closed pedal switch 31 over brake circuit conductor 28 to resistor 42, and the emitter of transistor 156 in timer modification circuit 33. However vehicle deceleration switch 37 is still closed, and thus there is no signal applied to the Darlington-pair 91, 92 at this time. As will be seen later in connection with FIGS. 3 and 5, other portions of the input circuit receive an energizing potential (but not a control signal) when the brake pedal is displaced.

After the input circuit receives the first or braking command signal over pedal switch 31, it is assumed that thereafter the deceleration level of the braked wheel exceeds the preset level. Although shown as a simple wheel-mounted switch the signal on line 30 can also be derived from the vehicle prop shaft, as will be explained in connection with FIG. 5. The signal on line 30 is applied over resistor 54 (FIG. 2) to rapidly turn on the Darlington-connected transistor pair 51, 52, and the voltage level at point 53 rapidly goes negative to switch off transistor 50. Non-conduction of transistor 50 effectively removes the clamping or hold-off signal applied over diode 73 to the multivibrator circuit, which goes into its free-running condition. During this operation vehicle deceleration switch 37 remains closed.

With the clamping effect removed from connection 74, the voltage level at this point rapidly goes positive and turns on transistor 60, which through the consequent multivibrator operation turns off transistor 58. As transistor 60 is rapidly driven into saturation, the voltage at its collector rapidly goes negative, and a negative-going signal is passed over resistor 67 to the base of transistor 93, rapidly turning this transistor off. As transistor 93 is rendered non-conductive, the voltage at its collector rapidly goes positive to gate on transistor 95. Thus current flows from conductor 98 over resistors 97, 96 and the collector-emitter path of transistor 95 to ground conductor 41. With transistor 95 conducting the voltage level at the junction between resistors 96, 97 rapidly goes negative, switching on transistor 100 to complete a path for current flow from conductor 98 through the emitter-collector path of transistor 100, and over resistors 101, 102 to ground conductor 41. With transistor 100 conducting the voltage level at the connection between resistors 101, 102 rapidly goes positive, gating on transistor 103 and completing a path for current flow from conductor 98 through winding 23 and the collector-emitter path of transistor 103. With this current flow through winding 23, actuator 16 is operated and piston 21 moves to the left (FIG. 1) to increase the effective area of the bore 15 and relieve the braking pressure in the line 17 that passes the braking force to the wheel cylinder 18. This pressure relief obtains while current flows through winding 23.

When the state of multivibrator 57 subsequently changes in a well known manner, transistor 58 is again conducting and transistor 60 is turned off, and the negative drive is removed from the base of transistor 93, allowing this transistor to become conductive again and thus resulting in turn off of the other transistors 95, 100, and 103, interrupting the current flow through solenoid winding 23. This cyclical operation is repeated so that in effect pulses of current pass through solenoid winding 23 in the manner represented generally by the small diagram 26 in FIG. 1. If the mechanical load of actuator 16 in displacing piston 21 to the left and then back to the right in a cyclical manner is very substantial, winding 23 can be that of a pilot solenoid which moves a larger solenoid to effect the actual displacement of piston 21.

Assuming now that a positive potential is present on brake conductor 28, and on conductor 36, relative to conductor 86, and that the level of vehicle deceleration exceeds a predetermined level, switch 37 closes and passes a negative-going signal over resistor 155 to turn or transistor 156, which in turn switches off transistor 158. In its turn-off transistor 158 removes base drive from transistor 84, rapidly turning this transistor off to allow capacitor 88 to charge to ground conductor 86. This charging provides a positive-going signal across capacitor 88 which is applied over resistor 90 to the base of first transistor 91 in the Darlington-connected pair 91, 92 to rapidly switch this pair of transistors on and pass a negative-going signal from the timer modification circuit 33 over conductor 34 to the timer circuit 25.

This negative-going signal is applied from the junction of resistors 75, 76 to the base of transistor 78 and to the base of transistor 82. Transistor 78 is rapidly turned on, turning off transistor 79 and effectively removing resistor 80 from its parallel connection with resistor 66, thus changing the RC time constant of the circuit including capacitor 64 and resistors 66, 80. This is the time constant which determines the "on" time of the output pulses from the multi-vibrator circuit, or determines the time interval during which the pressure in the brake line is relieved to prevent wheel skid. In a broad sense transistors 78, 79 can be considered together as a control switch for varying the effective value of the RC timing circuit (66, 80, 64) from a first value to a second value. Similarly the negative going signal applied over conductor 77 rapidly drives transistor 82 on. As transistor 82 is rendered conductive resistor 72 is effectively connected in parallel with resistor 71, and thus the RC time constant of the circuit including capacitor 62 and resistors 71, 72 is also changed. It is apparent that transistor 82 can also be considered as a control switch for modifying the effective value of the RC time constant circuit including the components 62, 71 and 72 from a first value to a second value.

Those skilled in the art will appreciate that various other systems of modifying a timing circuit can be utilized, and in fact different transistor types can be utilized than those depicted in the circuit of FIG. 2. By way of example an NPN type transistor can be substituted for a PNP type with the appropriate polarity reversal of the voltage supply and signals. Likewise the signal on brake conductor 28 adjacent vehicle deceleration switch 37 need not be a steady state supply from the brake circuit, but this conductor can be coupled to an additional contact set (not shown) provided for actuation by winding 23 of the actuator 16 to insure that when the rate of operation of timer circuit 25 is varied from the first rate to the second rate, the variation or change-over occurs in an appropriately synchronized manner.

Figure 3:
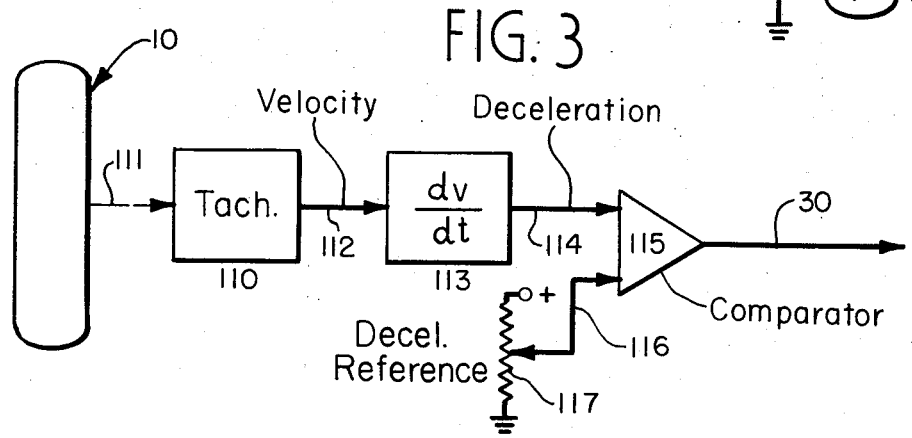
FIGS. 3 and 4 are block diagrams depicting alternative forms of the wheel velocity sensor unit shown generally in FIG. 1.

FIG. 3 depicts another embodiment of the invention in which the wheel deceleration sensor unit 32, shown as a simple mechanical switch in FIGS. 1 and 2, is replaced by a tachometer and an electrical circuit. That is, a tachometer 110 is coupled over a mechanical arrangement represented generally by broken line 111 to the wheel 10 to provide a series of output pulses on line 112 related to the velocity of the wheel 10. A differentiating stage 113 is connected to receive the velocity signal, or velocity-indicating pulses, and to differentiate the signal in a well known manner to provide on conductor 114 an output signal signifying the instantaneous deceleration level of the braked wheel 10. A comparator stage 115 is connected to receive the wheel deceleration signal over conductor 114, and to receive a deceleration reference level signal over conductor 116 from an adjustable deceleration reference potentiometer 117. When the deceleration level of the braked vehicle wheel 10 exceeds a preset level, as determined by the setting of potentiometer 117, an output signal is passed from comparator stage 115 over conductor 30 to input circuit 27 (FIG. 2). The remainder of the circuit operation is identical to that already described in connection with FIGS. 1 and 2.

Figure 4:
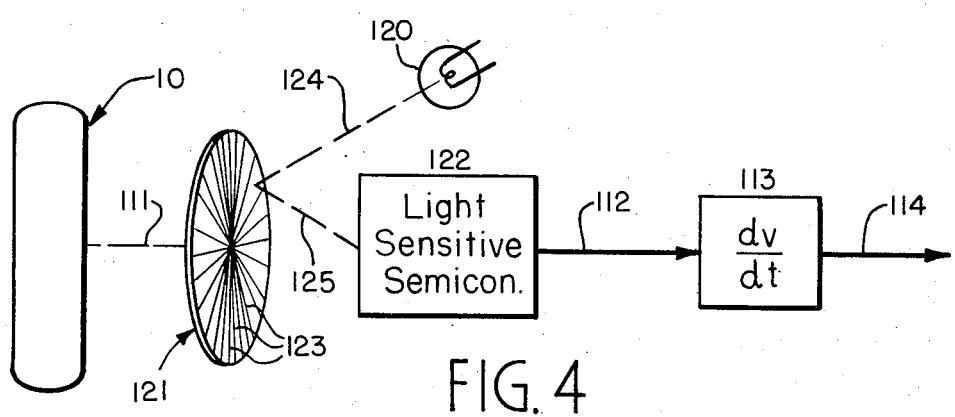

FIG. 4 depicts another embodiment of the invention in which a radiation sensing system is utilized to provide the vehicle wheel velocity signal in place of tachometer 110 in FIG. 3. As shown in FIG. 4 a lamp or radiation source 120 is provided adjacent a disc 121 to reflect light toward the input surface of a radiation sensitive semiconductor 122. The annular member 121 carries a series of radial markings 123 on its surface. These radial marks can be provided as slits in the disc itself, by black paint, or any other suitable means for either absorbing or passing the radiation 124 incident on round member 121. Disc 121 is connected to be driven over shaft 111 at an angular velocity which is a function of the rotational speed of wheel 10. As the incident light rays 124 either pass through or are partially absorbed by the markings 123, the level of light reflected over the path 125 varies to provide a variable output signal from unit 122 over conductor 112. The light-sensitive semiconductor can be a photocell, a light-sensitive transistor, or other unit useful with radiation of the frequency emitted from source 120. Techniques of both straight-through and reflected reading are now well known and understood and no further explanation need be given at this point.

Figure 5:
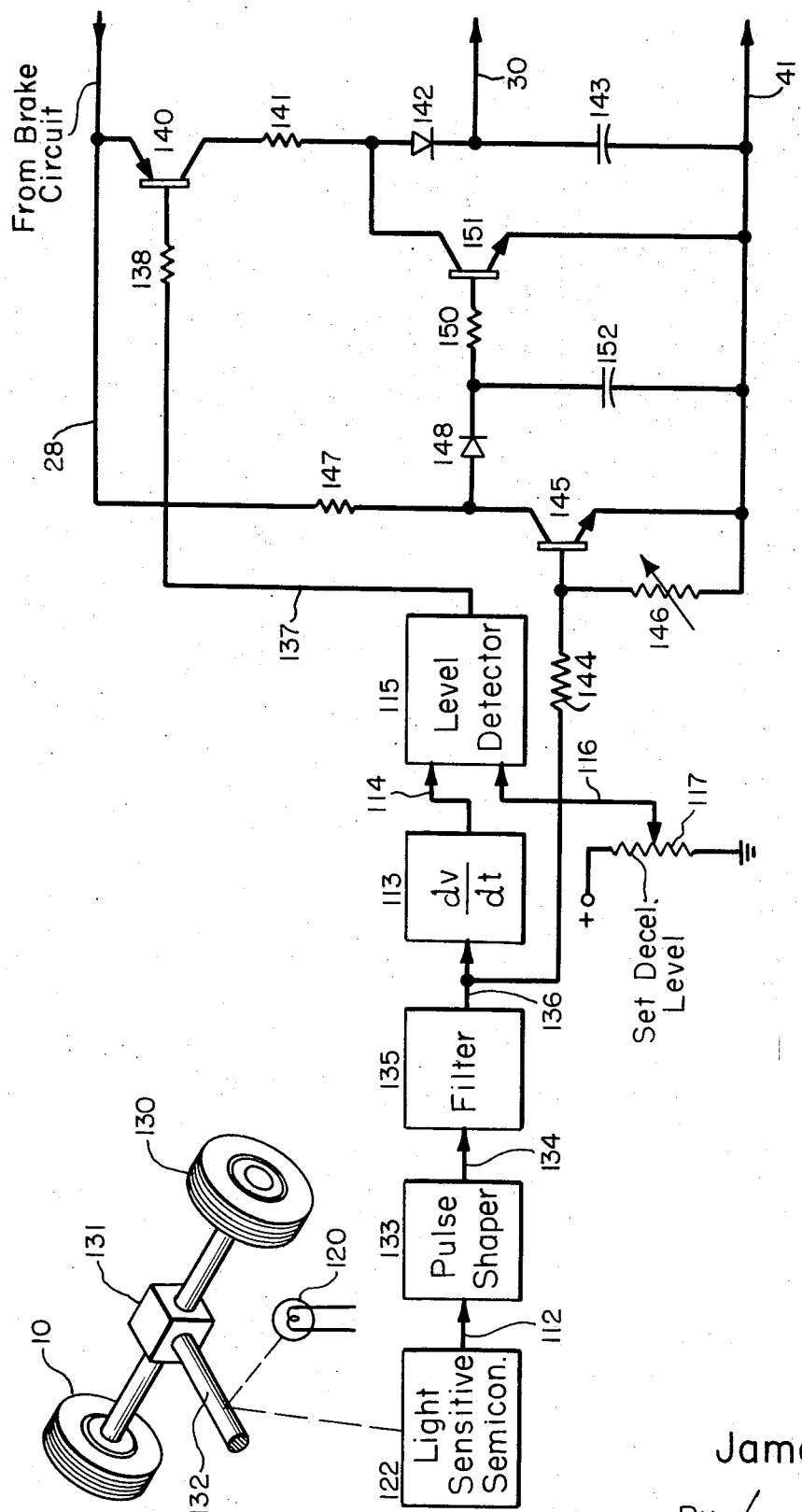
FIG. 5 is a diagrammatic showing, partly block and partly schematic, of a preferred embodiment of a wheel velocity sensing unit and associated components.

FIG. 5 depicts another system at present considered the preferred arrangement for providing the wheel deceleration signal between lines 30 and 41 in FIG. 2. Shown generally in FIG. 5 are the rear vehicle wheels 10 and 130 coupled over their respective axles to a differential unit 131, in its turn coupled to a prop shaft 132. The showing is illustrative only, for those skilled in the art will understand that the prop shaft is conventionally coupled over universal joints between the differential 131 and the drive shaft (not shown) of the main power plant. A lamp 120 or other radiation source is positioned to reflect light off markings or physical alterations on the prop shaft 132 to provide an output signal from light sensitive semiconductor 122 which is a function of the angular velocity of the prop shaft. Hence the output signal on line 112 representing velocity is really an average of the instantaneous angular velocities of the two wheels 10 and 130. The illustrated mounting is illustrative only; in practice a housing may be provided to encircle the prop shaft, providing a slotted or toothed disk which is driven in accordance with the prop shaft rotation to alternately block and transmit light from the lamp 120 to the semiconductor unit 122. A pulse shaper stage 133 is connected to provide better definition of the prop shaft speed signal on conductor 134. This stage may be a Schmitt trigger circuit or other well known pulse shaping arrangement. Filter stage 135 removes extraneous noise and provides an output signal on conductor 136 which is a function of the rotational speed of prop shaft 132. A differentiating stage 113 is connected to provide a deceleration signal over conductor 114 to the upper input connection of a level detector or comparator stage 115. The setting of potentiometer 117 provides a reference signal which is applied over conductor 116 to the lower input connection of stage 115. This level detector operates in a well known manner to provide an output signal on conductor 137 only when the level of the deceleration signal on conductor 114 exceeds the pre-established reference signal applied over conductor 116. Thus the precise deceleration level at which the system operates can be easily set by a simple potentiometer adjustment. The negative-going output signal on conductor 137 is applied through a resistor 138 to the base of a PNP type transistor 140, to gate this transistor on when the output signal from level detector 115 is present and an input potential is applied over conductor 28 to the emitter of transistor 140. This brake circuit signal on conductor 128 can be supplied from a pedal switch as shown in FIG. 1, or from the brake light circuit which may afford a more convenient electrical connection. The collector of transistor 140 is connected over a series circuit including resistor 141, diode 142, and a capacitor 143 to ground conductor 41.

The velocity-indicating signal on conductor 136 is also applied over a resistor 144 to the base of an NPN type transistor 145, which has its emitter coupled to ground conductor 41. Potentiometer 146 is coupled between ground and the common connection between resistor 144 and the base of transistor 145, to provide in effect a minimum speed setting below which transistor 145 will become non-conductive and the system will cease operation. By way of example the system can be set to drop out when the wheel velocity signal indicates the average rear wheel speed is equivalent to a vehicle speed of 8 mph. The collector of transistor 145 is coupled over a resistor 147 to brake circuit conductor 28, and the collector is also coupled over a diode 148 and a resistor 150 to the base of an NPN type transistor 151. A capacitor 152 is coupled between ground conductor 41 and the common connection between diode 148 and resistor 150. The emitter of transistor 151 is grounded and its collector is coupled to the common connection between resistor 141 and diode 142.

Assuming that the brake pedal has been depressed at a time when the wheel speed is above that necessary to actuate transistor 145 and the wheel deceleration level exceeds the signal provided by the setting of potentiometer 117, a negative-going wheel velocity signal is applied to the base of transistor 145, rapidly driving this semiconductor off. This provides a positive-going signal at its collector which is applied over diode 148 and resistor 150 to turn on transistor 151. The negative-going signal on conductor 137 also switches on transistor 140 to complete the illustrated circuit between brake circuit conductor 28 and ground conductor 41. Thus a positive-going signal is provided on conductor 30, relative to ground conductor 41, for application to the input circuit 27 shown in FIG. 2 and explained above.

Although the invention is described in the setting of a brake control system utilizing a liquid under pressure to actuate the wheel cylinders and operate the drum or disc brakes, the electrical output signal from timer circuit 25 lends considerable flexibility to the invention and it can be utilized to control other arrangements. By way of example if an electric motor is utilized to displace the braking elements at the wheel, a carbon pile resistance element can be coupled in series with the motor to regulate the level of the braking force. With such an arrangement the output signal from timer circuit 25 applied to solenoid winding 23 is utilized to compress the carbon pile and reduce the effective resistance. If a pneumatic system is utilized with a gas under pressure actuating an air motor in place of a wheel cylinder, an arrangement generally similar to that demonstrated in FIG. 1 is utilized to displace piston 21 and increase the total volume in the system, thereby reducing the braking pressure at the wheel.

Solely to assist those skilled in the art to make and use the invention and in no sense by way of limitation, a table of typical component values and identifications for the circuit elements in FIGS. 2 and 5 is set out below. Those skilled in the art will readily modify this arrangement, which has already been proven, to satisfy other requirements and needs.

| Component | Identification or Value | |
|---|---|---|
| 50, 51, 52, 58 60, 84, 91, 92, 93, 95, 145, 151 78, 79, 82, 100, 140, 156, 158 | 2N5172 (GE) | |
| 103 | MPS 3638 (Mot.) | |
| 103 | 40514 (RCA) | |
| 49, 73, 87, 142 | IN4148 (GE) | |
| 55, 85 | 5.IV, 10% (Mot.) | |
| 105, 148 | IN4002 (Mot.) | |
| 62, 64 | 1.0 mfd., 20 V. | |
| 88 | 0.33 mfd., 50 V. | |
| 143 | 0.1 mfd., 20 V. | |
| 152 | 44 mfd., 15 V. | |
| Resistance values are in ohms, tolerance ± 5%, 0.25 watt unless otherwise specified | | |
| 46 | 120 | 2 watts |
| 47, 150 | 1 K | |
| 48, 96 | 270 | 0.5 watt |
| 54, 63, 65 | | |
| 80, 83 | 100 K | |
| 59, 81, 97, 160 | 3 K | |
| 61, 68 | 1.5 K | |
| 66, 71 | 150 K | |
| 67, 90, 144, 146 | | |
| 155, 157 | 10 K | |
| 72 | 300 K | |
| 75, 76, 161 | 2.2 K | |
| 94 | 470 | |
| 101 | 25 | 5 watts |
| 102, 141 | 300 | |
| 104 | 10 | 2 watts |
| 138 | 10 | |
| 147 | 51 K | |

While only particular embodiments of the invention have been described and illustrated, it is manifest that various modifications and alterations may be made therein. It is therefore the intention in the appended claims to cover all such modifications and alterations as may fall within the true spirit and scope of the invention:

What is claimed is:

1. A brake control system for applying a braking force to a vehicle wheel responsive to provision of a braking command, including actuator means connected in the braking system, operative upon energization to reduce the level of the applied braking force to prevent wheel skid, and operative upon deenergization to terminate reduction of the braking force and allow the braking system to commence restoration of the braking force, in which the improvement comprises:

a timer arrangement connected to energize and deenergize the actuator means in a cyclical manner at a first rate;

an input circuit connected to initiate operation of said timer arrangement upon receipt of both a first signal indicating the braking command has been provided and a second signal indicating deceleration of the braked vehicle wheel has exceeded a preset level;

means for applying said first signal to the input circuit upon provision of the braking command;

means, including a first sensor means, for applying said second signal to the input circuit when the deceleration of the braked wheel exceeds the preset level;

a timer modification unit connected to change the cyclical operation of said timer arrangement from the first rate to a second rate upon receipt of a third signal indicating deceleration of the braked vehicle has exceeded a predetermined level; and means, including a second sensor means for applying said third signal to the timer modification unit when the deceleration of the braked vehicle exceeds the predetermined level.

2. A brake control system as claimed in claim 1 in which said timer arrangement comprises a multivibrator circuit, including at least one resistor-capacitor circuit connected to provide a predetermined time constant for regulating operation of the timer arrangement at said first rate, and switching means actuable in response to a control signal from said timer modification unit to change the effective value of said time constant to effect operation of said timer arrangement at said second rate.

3. A brake control system as claimed in claim 1 in which said actuator means includes an electrical winding, and an amplifier circuit is coupled between said timer arrangement and said winding to effect energization and deenergization of the winding at a rate determined by the operating rate of said timer arrangement.

4. A brake control system as claimed in claim 1 in which said first sensor means includes a normally closed mechanical switch, which switch is connected to open when the level of deceleration of the braked vehicle wheel exceeds the preset level.

5. A brake control system as claimed in claim 1, in which a delayed latching circuit is coupled between said first sensor means and said timer arrangement, to maintain operation of said timer arrangement for a predetermined time period after the first sensor means indicates the deceleration of the vehicle wheel is less than the preset level, and thereafter terminates operation of the timer arrangement, thus preventing continuous cycling of the brake control system when the brakes are still applied after the vehicle has come to a stop.

6. A brake control system as claimed in claim 1 in which said first sensor means includes a tachometer connected to be driven as a function of the angular displacement of said vehicle wheel to produce a series of velocity-indicating pulses, a differentiating stage connected to receive said pulses and provide an output signal connoting the deceleration level of the braked wheel, and a comparator stage, coupled between said differentiating stage and said input circuit, for passing said second signal to the input circuit when the comparator stage indicates the deceleration of the braked wheel exceeds the preset level.

7. A brake control system as claimed in claim 1 in which said first sensor means includes a substantially annular member having a series of radial markings, means for driving said annular member at an angular velocity related to the angular velocity of the braked vehicle wheel, means for directing a beam of radiation toward a reference location on said member to produce variations in the radiation level as said radial markings pass said reference location, a semiconductor unit positioned to sense the variations in radiation level to provide a series of output pulses related to the angular velocity of said vehicle wheel, a differentiating stage connected to receive said pulses and provide an output signal connoting the deceleration level of the braked wheel, and a comparator stage, coupled between said differentiating stage and said input circuit, for passing said second signal to the input circuit when the comparator stage indicates the deceleration of the braked wheel exceeds the preset level.

8. A brake control system as claimed in claim 7 in which said semiconductor unit is positioned to sense variations in the level of radiation reflected from said annular member as successive radial markings pass the reference location.

9. A brake control system as claimed in claim 1 in which the vehicle includes a prop shaft for transmitting power to the rear wheels, and in which said first sensor means includes a semiconductor unit positioned to sense variations in incident radiation level, means for providing a beam of radiation directed toward the semiconductor unit which means is driven at an angular velocity related to the angular velocity of the prop shaft and is positioned to vary the radiation beam to produce variations in the radiation level sensed by the semiconductor unit, thus providing a series of output pulses related to the angular velocity of said prop shaft, a differentiating stage connected to receive said pulses and provide an output signal connoting the deceleration level of the prop shaft, and a comparator stage, coupled between said differentiating stage and said input circuit, for passing said second signal to the input circuit when the comparator stage indicates the deceleration of the prop shaft exceeds the preset level.

10. A brake control system for applying a braking force to a vehicle wheel responsive to displacement of a brake pedal, including an actuator connected in the braking system, operative upon energization to reduce the level of the applied braking force to prevent wheel skid, and operative upon deenergization to terminate reduction of the braking force and allow the braking system to commence restoration of the braking force, in which the improvement comprises:

a multivibrator circuit connected to energize and deenergize the actuator in a cyclical manner, said multivibrator circuit including a timing circuit with an RC time-constant and a control switch connected for operation to change the value of the RC time-constant and correspondingly change the operation of the multivibrator circuit from a first rate to a second rate;

an input circuit connected to initiate operation of said multivibrator circuit upon receipt of both a first signal indicating the brake pedal has been displaced and a second signal indicating deceleration of the braked vehicle wheel has exceeded a preset level;

means, including a pedal switch, positioned to provide said first signal to the input circuit upon displacement of the brake pedal;

means, including a first sensor, for applying said second signal to the input circuit when the deceleration of the braked wheel exceeds the preset level;

a time constant modification circuit connected to change the cyclical operation of said multivibrator circuit from the first rate to the second rate upon receipt of a third signal indicating deceleration of the vehicle has exceeded a predetermined level; and means, including a second sensor, for applying said third signal to the time constant modification circuit when the deceleration of the vehicle exceeds the predetermined level.

11. A brake control system as claimed in claim 10 in which said actuator includes an electrical winding, and an amplifier circuit coupled between said multivibrator circuit and said winding to effect energization and deenergization of the winding at a rate determined by the operating rate of the multivibrator circuit.

12. A brake control system as claimed in claim 10 in which said first sensor includes a normally closed mechanical switch, which switch is connected to open when the level of deceleration of the braked wheel exceeds the preset level.

13. A brake control system as claimed in claim 10 in which said first sensor includes a tachometer coupled to said vehicle wheel to produce a series of velocity-indicating pulses, a differentiating stage connected to receive said pulses and provide an output signal signifying the deceleration level of the braked wheel, a comparator stage coupled between said differentiating stage and said input circuit, and an adjustable reference component coupled to said comparator stage for establishing a reference signal representing said preset level of wheel deceleration, so that the comparator stage passes said second signal to the input circuit when the comparator stage indicates the deceleration of the braked wheel exceeds the preset level.

14. A brake control system as claimed in claim 10 in which said first sensor includes a round member having a series of radial marks, means for driving the round member at an angular velocity related to the angular velocity of the braked wheel, means for directing a light beam toward a reference location on said member to produce variations in light level as the radial marks pass said reference location, a semiconductor unit positioned to sense the variations in light level to provide a series of output pulses related to the angular velocity of said vehicle wheel, a differentiating stage connected to receive said pulses and to provide an output signal connoting the wheel deceleration level, a comparator stage coupled between said differentiating stage and said input circuit, and an adjustable reference component coupled to said comparator stage for establishing a reference signal representing said preset level of wheel deceleration, so that the comparator stage passes said second signal to the input circuit when the comparator stage indicates the deceleration of the braked wheel exceeds the preset level.

15. A brake control system as claimed in claim 14 in which said semiconductor unit is positioned to sense variations in the level of light reflected from said round member as successive radial marks pass the reference location.

16. A brake control system as claimed in claim 10, in which a delayed latching circuit is coupled between said first sensor and said multivibrator circuit, to maintain operation of the multivibrator circuit for a predetermined time period after the first sensor indicates the wheel deceleration is less than the preset level, and thereafter terminates operation of the multivibrator circuit to prevent continuous cycling of the brake control system when the brake pedal is still displaced after the vehicle has come to a stop.

17. A brake control system as claimed in claim 10, in which a delayed latching circuit is coupled between said second sensor and said control switch which changes the value of the RC time-constant in the multivibrator circuit, to maintain said control switch actuated for a predetermined time period after the second sensor indicates the vehicle deceleration is less than the predetermined level, and thereafter allows restoration of said control switch to again provide operation of said multivibrator circuit at said first rate.

18. A brake control system as claimed in claim 10 in which the vehicle includes a prop shaft for transmitting power to the rear wheels, and in which said first sensor includes a semiconductor unit positioned to sense variations in incident radiation level, means for providing a beam of radiation directed toward the semiconductor unit, means which is driven at an angular velocity related to the angular velocity of the prop shaft and is positioned to vary the radiation beam to produce variations in the radiation level sensed by the semiconductor unit, thus providing a series of output pulses related to the angular velocity of said prop shaft, a differentiating stage connected to receive said pulses and provide an output signal connoting the deceleration level of the prop shaft, and a comparator stage, coupled between said differentiating stage and said input circuit, for passing said second signal to the input circuit when the comparator stage indicates the deceleration of the prop shaft exceeds the preset level.

19. A brake control system for applying a braking force to a vehicle wheel responsive to displacement of a brake pedal coupled to a master cylinder, including a wheel cylinder coupled to a braking member for the vehicle wheel, and an actuator comprising a bore portion coupled between the master cylinder and the wheel cylinder, a piston displaceable in the actuator to increase and decrease the effective volume of the bore, an electrical winding disposed to displace said piston to vary the bore volume as said winding is energized, and a bias spring positioned to return said piston toward its original position after said winding is deenergized, in which the improvement comprises:

a multivibrator circuit connected to energize and deenergize the actuator winding in a cyclical manner, said multivibrator circuit comprising first and second RC timing circuits with first values of time constants to provide multivibrator operation at a first rate, and first and second control switches connected for operation responsive to receipt of a control signal to change the values of the RC timing circuits to second values to effect multivibrator operation at a second rate;

an input circuit connected to initiate operation of the multivibrator circuit at said first rate upon receipt of both a first signal indicating the brake pedal has been displaced and a second signal indicating deceleration of the braked wheel has exceeded a preset level;

means, including an electrical switch positioned for actuation by displacement of the brake pedal, for applying said first signal to the input circuit;

means, including a first sensor, for applying said second signal to the input circuit when the wheel deceleration exceeds the preset level;

a time constant modification circuit connected to apply said control signal to the first and second control switches in the multivibrator circuit and effect operation of the multivibrator circuit at the second rate upon receipt of a third signal indicating vehicle deceleration has exceeded a predetermined level; and means, including a second sensor, for applying said third signal to the time constant modification circuit when the vehicle deceleration exceeds the predetermined level.

20. A brake control system as claimed in claim 19 in which the vehicle includes a prop shaft for transmitting power to the rear wheels, and in which said first sensor includes a light-sensitive unit positioned to sense variations in incident light level, means for providing light directed toward the light-sensitive unit which means is driven at an angular velocity related to the angular velocity of the prop shaft and is positioned to vary the light beam to produce variations in the light level sensed by the semiconductor unit, thus providing a series of output pulses related to the angular velocity of said prop shaft, a differentiating stage connected to receive said pulses and provide an output signal connoting the deceleration level of the prop shaft, and a comparator stage, coupled between said differentiating stage and said input circuit, for passing said second signal to the input circuit when the comparator stage indicates the deceleration of the prop shaft exceeds the preset level.

* * * * *